United States Patent [19]

Maekawa

[11] Patent Number: 5,304,980
[45] Date of Patent: Apr. 19, 1994

[54] DISTANCE DETECTING APPARATUS FOR A VEHICLE

[75] Inventor: Hiroko Maekawa, Himeji, Japan

[73] Assignee: Mitsubishi Denki Kabushiki Kaisha, Tokyo, Japan

[21] Appl. No.: 823,468

[22] Filed: Jan. 22, 1992

[30] Foreign Application Priority Data

Jan. 24, 1991 [JP] Japan .................... 3-022715

[51] Int. Cl.$^5$ .............................. B60Q 1/00
[52] U.S. Cl. .................... 340/435; 340/903; 340/988; 356/1; 348/170
[58] Field of Search .......... 340/988, 435, 903, 436, 340/942, 721; 318/587; 364/424.01, 424.02, 460, 461, 518, 449; 180/167; 358/103, 105, 126; 356/1

[56] References Cited

U.S. PATENT DOCUMENTS

| | | |
|---|---|---|
| 4,749,848 | 6/1988 | Sorimachi . |
| 4,847,772 | 7/1989 | Michalopoulos et al. .......... 340/937 |
| 4,926,346 | 5/1990 | Yokoyama ..................... 364/424.02 |
| 4,987,357 | 1/1991 | Masaki ................... 340/988 |
| 5,023,712 | 6/1991 | Kajiwara ............................. 358/126 |
| 5,039,217 | 8/1991 | Maekawa et al. .................... 340/904 |
| 5,131,740 | 7/1992 | Maekawa ................. 356/1 |
| 5,165,108 | 11/1992 | Asayama ............................. 340/903 |
| 5,168,355 | 12/1992 | Asayama ............................. 358/126 |

FOREIGN PATENT DOCUMENTS

| | | |
|---|---|---|
| 196412 | 11/1983 | Japan . |
| 182613 | 8/1987 | Japan . |
| 2-232511 | 12/1990 | Japan . |
| 0208246 | 10/1992 | Japan ................................. 340/435 |

*Primary Examiner*—Brent Swarthout
*Attorney, Agent, or Firm*—Sughrue, Mion, Zinn, Macpeak & Seas

[57] ABSTRACT

A distance detecting apparatus can not only measure the distance to a target preceding vehicle but also detect obstacles such as an intervening vehicle, other vehicles running around or adjacent the target vehicle without any movement of the apparatus itself. The apparatus includes a window setting device 13 for setting a plurality of distance-measuring windows 21 through 25 on a screen 20 on the basis of one of two image signals generated by a pair of video cameras 5, 6, a switch 14 for setting an image-following window 26 enclosing the preceding vehicle to be followed, and a CPU 12 for measuring the distance to an object in each distance-measuring window as well as the distance to an object in the image-following window.

4 Claims, 6 Drawing Sheets

DISTANCE DETECTING APPARATUS FOR A VEHICLE

BACKGROUND OF THE INVENTION

The present invention relates to an apparatus for optically measuring the distance from a subject vehicle, on which the apparatus is mounted, to objects such as a preceding vehicle running on the same lane of a road, or obstacles such as other vehicles around the preceding vehicle which are running on other lanes of the road or coming into the same lane at locations between the preceding vehicle and the subject vehicle.

Examples of an optical distance detecting apparatus utilizing image sensors such as video cameras are known from Japanese Patent Publication Nos. 63-38085 and 63-46363. As illustrated in FIG. 6, the apparatuses disclosed therein commonly have a pair of first and second parallel optical systems having two convex lenses 101, 102 disposed in a horizontally aligned relation at a prescribed distance L away from each other. A pair of separate image sensors 103, 104 are horizontally disposed at focal points of the lenses 101, 102 at a distance f from the locations of corresponding lenses 101, 102, respectively, for generating respective image signals to a common signal processor 120. The signal processor 120 successively shifts the image signals from the image sensors 103, 104 and electrically superposes them one over the other, so that the distance R from the lenses 101, 102 to an object 121 is calculated based on the principle of triangulation using the following formula:

$$R = (f \times L)/d$$

where d is a shift distance by which the image signals are moved to obtain the best match.

In addition, Japanese Patent Publication No. 60-33352 discloses a method of following an image of a preceding vehicle as sensed by an image sensor such as a video camera. According to this method, the driver of a vehicle needs to manually set and continuously adjust an image-following gate or window enclosing an object to be followed on a display screen while looking at the screen, so as not to lose sight of the image of the preceding vehicle.

With the distance detecting apparatus as described above, however, it is only possible to measure the distance to an object which lies in a direction of the axis of light which is projected from each video camera. Therefore, in cases where the apparatus is mounted on a vehicle for the purpose of measuring the distance to a preceding vehicle, it is necessary to properly move the video cameras so as to adjust the axis of light projected therefrom toward the preceding vehicle. Moreover, if there are many objects within the field of view of the image sensors, it is unclear to which object the distance from the subject vehicle is being detected. In particular, if other vehicles travelling around or approaching the target vehicle are coming into the fields of view of the video cameras, the driver cannot tell to which vehicle the distance is detected.

SUMMARY OF THE INVENTION

Accordingly, the present invention is intended to overcome the above-mentioned problems encountered with the conventional apparatuses.

An object of the invention is to provide a novel and improved distance detecting apparatus for a vehicle which, once the driver sets an image-following window enclosing a target preceding vehicle, is not only able to measure the distance to the target preceding vehicle in an automatic fashion without the need of any movement of the apparatus as long as the preceding vehicle lies in the field of view of the apparatus, but also distances to a plurality of objects as well so as to detect possible obstacles such as other vehicles running near or around the target vehicle.

In order to achieve the above objects, according to the present invention, there is provided a distance detecting apparatus for a vehicle comprising: a pair of optical sensing means each for optically sensing a plurality of objects and generating a corresponding image signal; first memory means for storing the output image signal from one of the optical sensing means as a first image signal; second memory means for storing the output image signal from the other of the optical sensing means as a second image signal; a display with a screen for displaying the images of the objects as sensed by the optical sensing means; window setting means for successively setting an image-following window on the screen of the display at a location enclosing a target preceding vehicle as well as a plurality of distance-measuring windows at predetermined locations on the screen of the display; distance calculating means for comparing the images of the objects in the respective windows stored in the first memory with the corresponding images of the objects stored in the second memory so as to detect deviations therebetween, the distance calculating means individually calculating the distance to an object in each window based on the calculated deviations; and image-following-window updating means for successively comparing at predetermined intervals an image in the image-following window, which is currently sensed by one of the optical sensing means and stored in the first memory, with an image of the target vehicle, which was previously sensed by the one of the optical sensing means and stored in the first memory, so as to update the image-following window at a location which provides the best match therebetween.

Preferably, the distance calculating means basically calculates the distance to an object in each of the distance-measuring windows as well as that in the image-following window but does not perform a distance calculation for a specific distance-measuring window of which a portion more than a predetermined ratio thereof relative to its entire area overlaps the image-following window.

Preferably, the image-following window is visible on the screen, while the distance-following windows are invisible on the screen.

The distance calculating means can also find a vehicle approaching the target vehicle from the side or behind and intervening between the target vehicle and a following vehicle on which the apparatus is mounted.

The above and other objects, features and advantages of the invention will become more readily apparent from the detailed description of a few preferred embodiments of the invention taken in conjunction with the accompanying drawings.

DESCRIPTION OF THE PREFERRED EMBODIMENT

A preferred embodiment of the present invention will now be described in detail with reference to the accompanying drawings.

Figure 1:
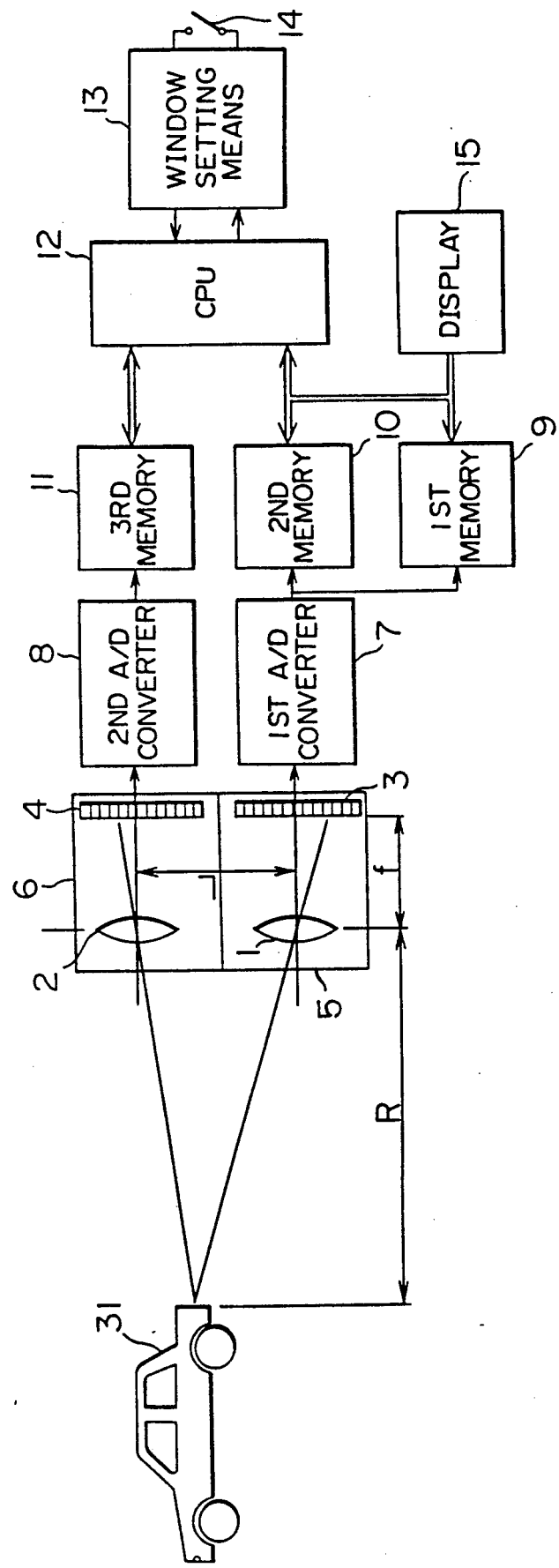
FIG. 1 is a schematic block diagram showing the general arrangement of a distance detecting apparatus for a vehicle in accordance with the present invention.

FIG. 1 illustrates, in a block diagram, the schematic arrangement of a distance detecting apparatus which is constructed in accordance with the principles of the invention and which is mounted on a subject vehicle for measuring the distances to objects such as preceding vehicles, obstacles and the like lying ahead of the subject vehicle.

Figure 2:
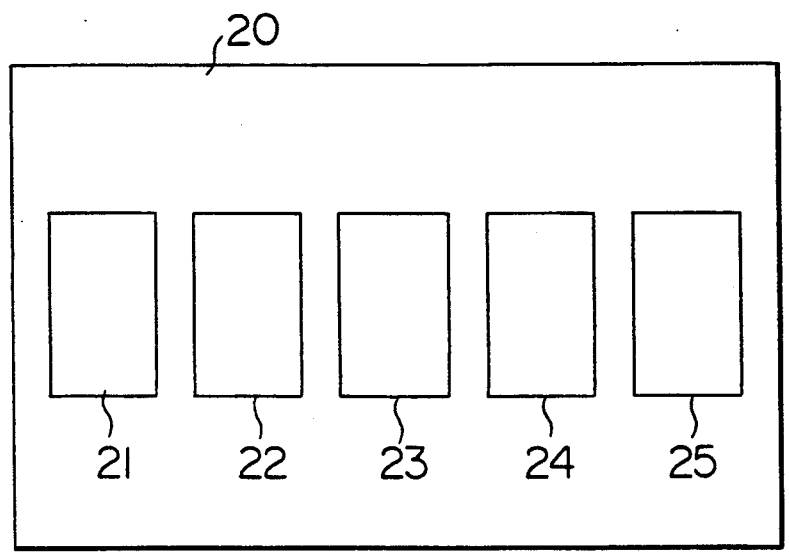
FIG. 2 is an explanatory view showing a plurality of distance-measuring windows defined on the screen of a display by the apparatus of FIG. 1.

The apparatus illustrated includes a pair of first and second parallel optical sensing means 5, 6 in the form of video cameras, which comprise two convex lenses 1, 2 disposed in a vertically or otherwise aligned relation at a prescribed distance L away from each other, and a pair of separate first and second (e.g., lower and upper) image sensors 3, 4 which are vertically or otherwise disposed at the focal length f of the lenses 1, 2, respectively, for successively generating at predetermined intervals first and second image signals in the form of analog signals each representative of a two-dimensional image of an object such as a preceding vehicle to be followed, which are input to a pair of corresponding first and second analog-to-digital (A/D) converters 7, 8. The first and second A/D converters 7, 8 convert the analog output signals from the first and second video cameras 5, 6 into corresponding digital values. The output of the first A/D converter 7 is input to a first and a second memory 9, 10 and stored therein as $a(i, j)$ and $b(i, j)$ [$1 \leq i \leq x_1$ and $1 \leq j \leq y_1$], respectively. The output of the second A/D converter 8 is input to a third memory 11 and stored therein as $c(i, j)$. A microcomputer 12, which acts as a distance calculating means and an image-following-window updating means, performs data transmission with the memories 9, 10, 11 so that it makes various calculations and determinations based on the data stored in the memories 9, 10, 11. A window setting means 13 having a switch 14 is connected to the CPU 12 so that when the driver manipulates the switch 14, the window setting means 13 sends to the CPU 12 commands for setting a plurality (e.g., five in the illustrated embodiment) of distance-measuring windows 21 through 25, as shown in FIG. 2, and an image-following window 26, as designated by a solid line in FIG. 3, on a screen 20 of a display 15 which is connected to the first and second memories 9, 10 and the CPU 12. As shown in FIG. 2, the first through fifth windows 21 through 25 are disposed on the display screen 20 at horizontally spaced or separate predetermined locations thereof.

The CPU 12 performs an image following function of successively examining a relationship such as similarity between a currently ended image $a(i, j)_t$ stored in the first memory 9 and a previously sensed image $a(i, j)_{t-1}$ stored therein, and forming and updating an image-following window on the display screen 20 at a location in which there is the best match between the current and previous images, as described below in detail. The CPU 12 also performs a distance measuring function of measuring the distance to an object in each of the windows 21 through 26 from images $b(i, j)$, $c(i, j)$ stored in the memories 10, 11 in the same manner as previously described with reference to the conventional distance detecting apparatus of FIG. 6.

The operation of the above embodiment will be described below while referring to FIGS. 2, 3, and 4A through 4D. First, the image following function of the apparatus is explained. FIG. 2 illustrates a plurality (e.g., five in the illustrated embodiment) of distance-measuring windows 21 through 25 formed on the screen 20 of the display 15 at predetermined fixed locations horizontally spaced from each other at substantially equal intervals. Actually, these windows 21 through 25 are not displayed on the screen 20 so that the driver can clearly watch the image-following windows 26 in an easy manner. In cases where no setting for image following is made by the driver through the switch 14 or in the even that the apparatus becomes unable to follow the target preceding vehicle 31 during vehicle following operation, distance measurements alone are effected.

Figure 3:
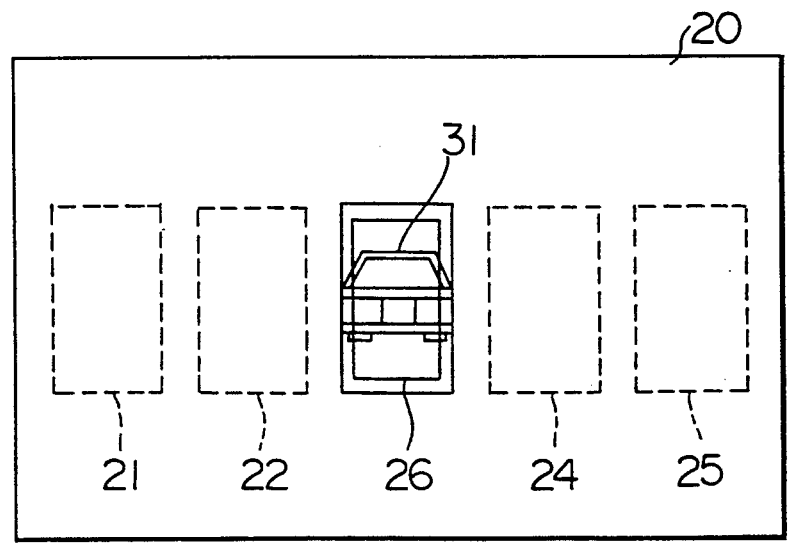
FIG. 3 is an explanatory view showing that an image following window for following a preceding vehicle is set in one of the plurality of windows by the apparatus of FIG. 1.
Figure 4A:
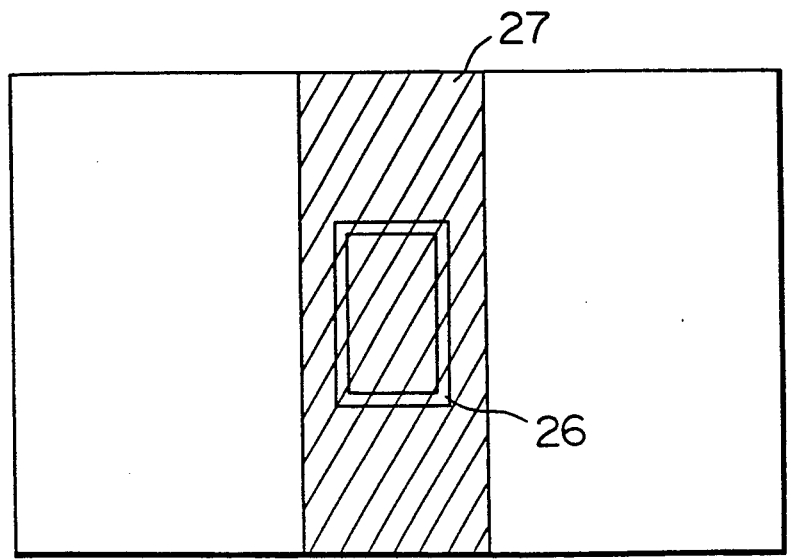
FIGS. 4A, 4B, 4C and 4D are explanatory views showing a series of distance-measuring processes performed by the apparatus of FIG. 1.

In order to follow the target preceding vehicle 31, the driver first manipulates the switch 14 of the window setting means 13 so as to define an image-following window 26 enclosing an image of the target vehicle 31 on the screen 20 of the display 15 while looking at the display screen, as shown in FIG. 3. In the illustrated example, the image-following window 26 is defined at the location of the third or central windows 23. More specifically, the preceding vehicle 31 running ahead of the subject vehicle is sensed by the first or lower video camera 3 which periodically generates a corresponding analog signal. The output signal from the video camera 3 is digitized by the first A/D converter 7, and stored in the first and second memories 9, 10. When the driver properly manipulates the switch 14 of the window setting means 13 to set an image following windows 26 enclosing therein an image of the target preceding vehicle 31 on the screen 20 of the display 15, as shown in FIG. 4A, the CPU 12 reads out from the first memory 9 picture element signals within the image-following window 26 that catch the preceding vehicle 31, and adopts them as a reference image signal, which is used as a basis for updating the image-following windows 26. Subsequently, at a predetermined time later, the CPU 12 makes a comparison between a current image signal $a(i, j)_t$ in a vertically extending searching area 27 having a predetermined with $H_0$ on the screen 20, which is currently sensed by the first video camera 5 and stored in the second memory 10, and a previous or last image signal a(i, j)$_{j,l}$ of the target preceding vehicle 31, which was previously sensed by the first video camera 5 and stored as the reference image signal in the first memory 9, while shifting the current image signal with respect to the last image signal one picture element by one picture element, to determine a new position 26A (FIG. 4B) of the image-following window 26 which provides the best match therebetween. Then, the CPU 12 sets and updates the image-following window at the new position 26A thus determined. A new vertical searching area 27A having the width H$_0$ is then defined around the updated image-following windows 26A, and the above process is repeated to update the window 26A. In this manner, the image-following window is successively and periodically updated so as to catch the image of the target preceding vehicle 31 in a precise manner.

Figure 4B:
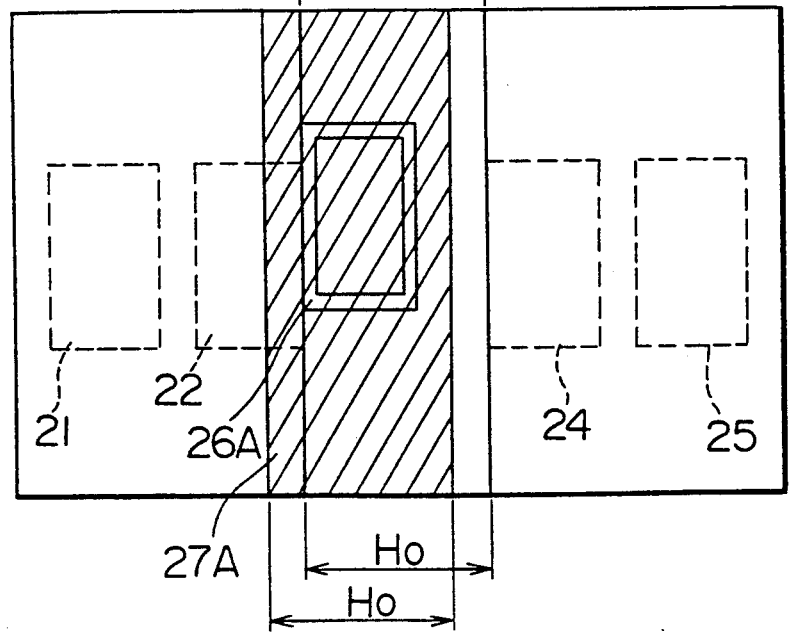
Figure 4C:
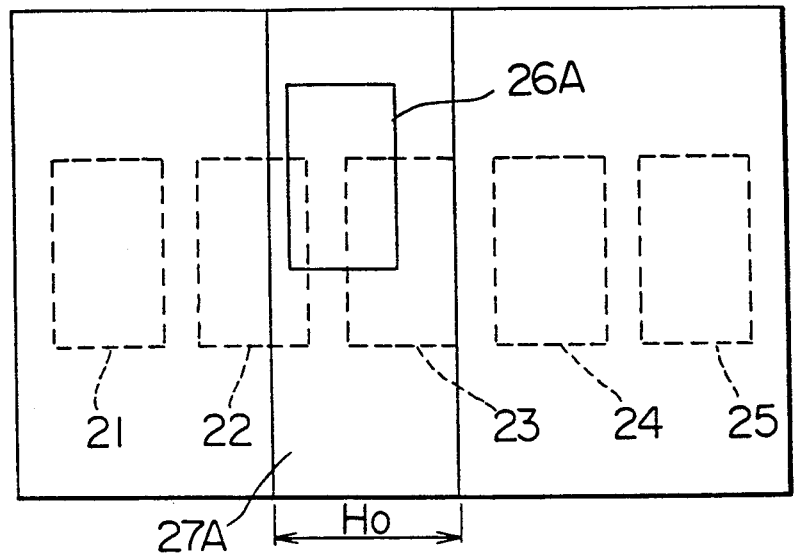
Figure 4D:
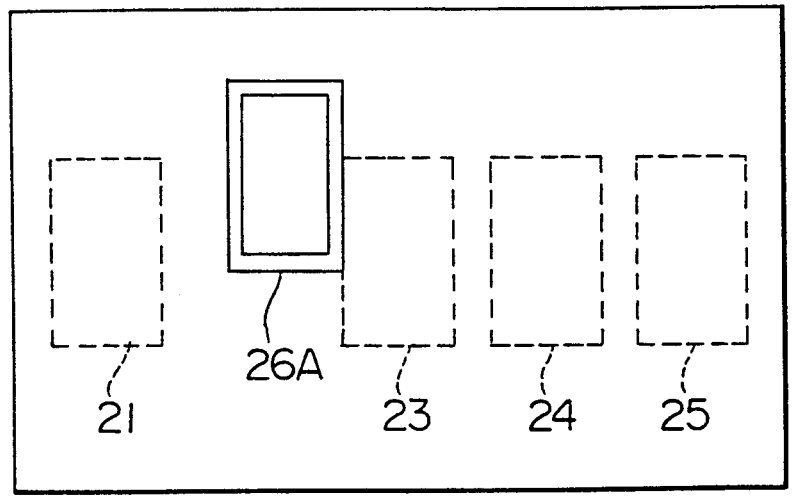

Although in the above description, the search area 27 (27A) in the first memory 9 for determining a new image-following windows 26 (26A) is a vertically extending band area, as designated by hatching in FIGS. 4A, 4B, it can be arbitrarily determined otherwise as required.

Figure 6:
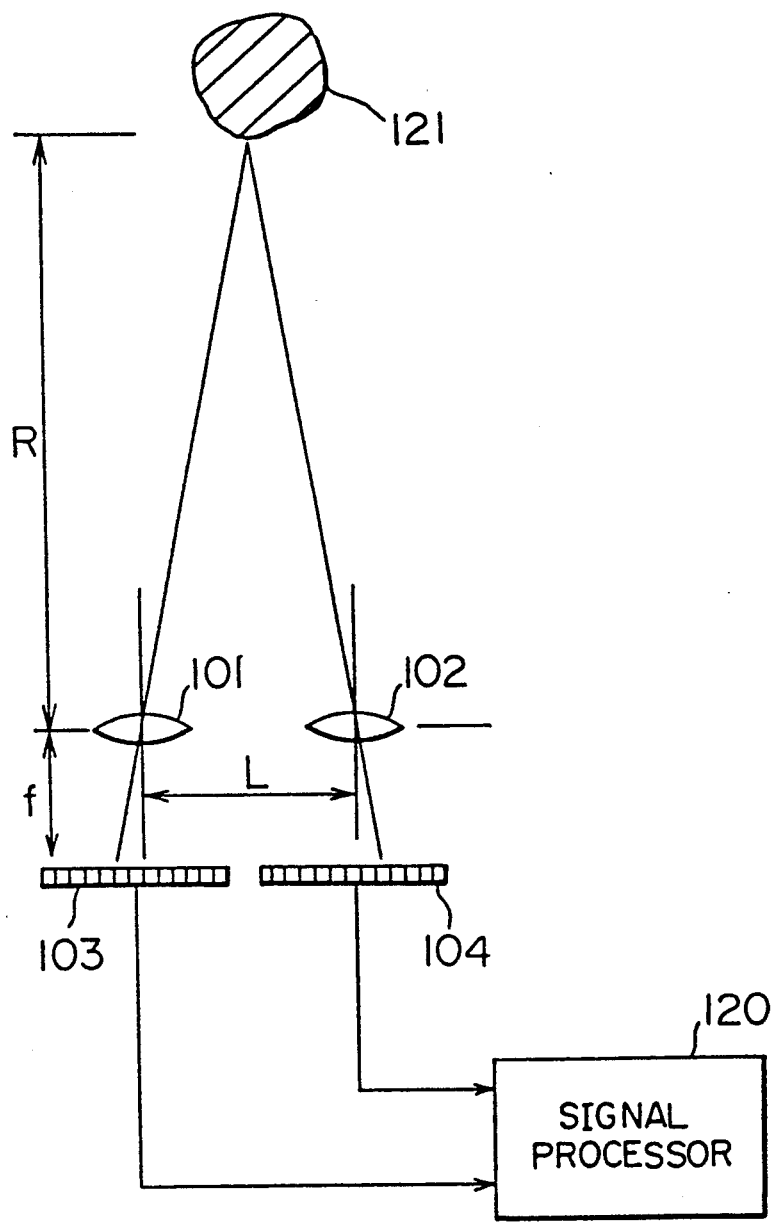
FIG. 6 is a schematic view illustrating the general arrangement of a conventional distance detecting apparatus.

For the successively updated image-following windows 26, the distance to an object or the target preceding vehicle 31 therein is successively performed by making a comparison between an image signal of the target vehicle 31 in the window 26 stored in the second memory 10 and a corresponding image signal stored in the third memory 11 in the same manner as previously described with reference to the conventional apparatus of FIG. 6.

Likewise, distance measurement is successively carried out at predetermined intervals for each of the distance-measuring windows 21 through 25 so as to measure the distance to an object in each window. Thus, in cases where there are a plurality of preceding vehicle which are running ahead of the subject vehicle and which are caught by the respective windows 21 through 25, it is possible to concurrently detect the distances to the respective preceding vehicles.

Moreover, if the image-following window 26 overlaps a substantially portion (e.g., more than a half area) of one of the distance-measuring windows 21 through 25, an object caught by the overlapping distance-measuring window may possibly be the target preceding vehicle 31, so there is not need for distance measurement in that window. Accordingly, no distance measurement is performed for that window.

The distance-measuring windows 21 through 25 may be displayed on the screen 20 of the display 15, but preferably they are not displayed for the sake of the driver's convenience in clearly watching the image of the preceding vehicle 31 on the screen 20. The values of measured distances can be indicated or displayed for each window, or for the image-following window alone, or no such indications may be effected as required or desired by the purposes of use of the apparatus.

Figure 5A:
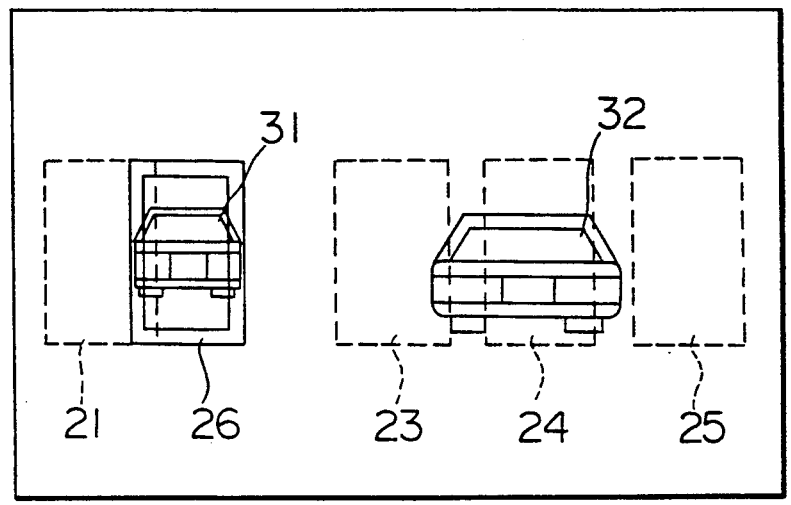
FIG. 5A is an explanatory view showing the case in which there is an intervening vehicle between the preceding vehicle and the subject vehicle.
Figure 5B:
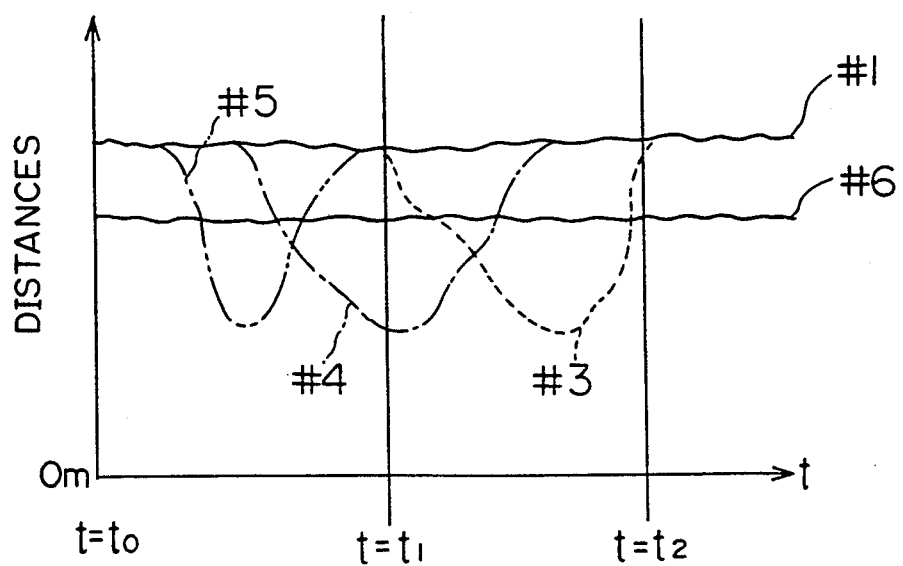
FIG. 5B is a graphical representation showing the distances measured to various objects in the distance-measuring windows in relation to time.

Utilizing the results of distance measurements in the respective distance-measuring windows 21 through 25 as well as in the image-following windows 26, it is possible to find another vehicle 32 approaching the target preceding vehicle 31 from the side or behind as follows, as shown in FIG. 5A. If the measured distances to objects in the adjacent windows sequentially vary over time as illustrated in FIG. 5B, it is determined that another intervening vehicle 32 is coming inbetween the target preceding vehicle and the subject vehicle or going away therefrom. Specifically, FIG. 5B shows the distances over time as measured in the respective windows wherein an upper solid line #1 designates the distance (e.g., substantially infinity) to an object at a very large distance measured in the first window 21; a lower solid line #6 designates the distance to the preceding vehicle 31 measured in the image-following windows 26; and curved lines #3, #4 and #5 designate the distances to the intervening vehicle 32 measured in the third, fourth and fifth window 23, 24 and 25, respectively. In the example illustrated in FIG. 5B, the distance measured in the image-following windows 26 indicated by the lower solid line #6 is substantially constant, and the distance measured becomes the shortest first at the fifth or right-most window 25 (see line #5), then at the fourth window 24 (see line #4), and finally at the central or third window 23 (see lone #3). Thus, it is determined that an object in the form of the intervening vehicle 32 is coming near to the target preceding vehicle 31 in the image-following window 26 from the right, so an indication of warning the intervening vehicle to the driver can be displayed on the screen 20. Instead of such a displayed indication, other warning means such as a buzzer can be actuated. On the contrary, if the shortest distance measured among the windows varies from the central or third window 23 to the right-most or fifth windows 25 as time passes, it is determined that an object being measured is going away from the target vehicle.

Similarly, a vehicle approaching the target vehicle 31 from the left in FIG. 5A can be detected by the apparatus and warned to the driver.

Although in the above description, the number of the distance-measuring windows as illustrated is five, any number of windows can be used as necessary. Also, a ratio of the overlapping area of a window to the entire area thereof at which distance measurement for that window is not effected, can be arbitrarily decided according to the conditions of use of the apparatus.

What is claimed is:

1. A distance detecting apparatus for a vehicle comprising:

a pair of optical sensing means for individually optically sensing a plurality of objects and generating corresponding image signals;

first memory means for storing an output image signal from one of said optical sensing means as a first image signal;

second memory means for storing an output image signal from another one of said optical sensing means as a second image signal;

a display having a screen for displaying images of said objects as sensed by said pair of optical sensing means;

window setting means for successively setting an image-following window on the screen of said display at a location enclosing a target preceding vehicle as well as a plurality of distance-measuring windows at predetermined locations on the screen of said display;

distance calculating means for comparing images of said objects associated with said respective windows and stored in said first memory means with corresponding images of said objects stored in said second memory means so as to detect deviations therebetween, said distance calculating means individually calculating the distance to an object associated with each window based on the detected deviations; and image-following-window updating means for successively comparing at predetermined intervals an image in said image-following window, which is currently sensed by one of said optical sensing means and stored in said first memory, with an image of said target vehicle, which was previously sensed by said one of said optical sensing means and stored in said first memory, so as to update the image-following window at a location which provides a best match therebetween.

2. A distance detecting apparatus according to claim 1, wherein said distance calculating means:

a) calculates the distance to an object in each of said distance-measuring windows as well as to a target vehicle in said image-following window, b) determines if more than a predetermined ratio of a specific distance-measuring window, relative to an entire area thereof, overlaps said image-following window, and c) when said determination is positive, does not perform a distance calculation for said specific distance-measuring window.

3. A distance detecting apparatus according to claim 1, wherein said image-following window is visible on said screen, while said distance-measuring windows are invisible on said screen.

4. A distance detecting apparatus according to claim 1, wherein said distance calculating means measures sequential variations in the calculated distances to objects in adjacent windows over time to thereby detect a vehicle approaching said target vehicle from the side or behind and intervening between said target vehicle and a following vehicle on which said apparatus is mounted.

* * * * *